United States Patent
Chobot et al.

(10) Patent No.: US 10,009,971 B2
(45) Date of Patent: Jun. 26, 2018

(54) LIGHTING APPARATUS USING MULTIPLE LED STRINGS WITH CURRENT MIRROR CIRCUITRY AND METHODS OF OPERATING SAME

(71) Applicant: Cree, Inc., Durham, NC (US)

(72) Inventors: Joseph Paul Chobot, Durham, NC (US); Mike Walters, Apex, NC (US)

(73) Assignee: Cree, Inc., Durham, NC (US)

( * ) Notice: Subject to any disclaimer, the term of this patent is extended or adjusted under 35 U.S.C. 154(b) by 5 days.

(21) Appl. No.: 14/807,431

(22) Filed: Jul. 23, 2015

(65) Prior Publication Data
US 2017/0027033 A1   Jan. 26, 2017

(51) Int. Cl.
*H05B 37/00*   (2006.01)
*H05B 33/08*   (2006.01)

(52) U.S. Cl.
CPC ..... *H05B 33/0827* (2013.01); *H05B 33/0812* (2013.01); *H05B 33/0815* (2013.01); *H05B 33/0857* (2013.01); *Y02B 20/345* (2013.01)

(58) Field of Classification Search
CPC ............ H05B 33/0812; H05B 33/0815; H05B 33/0827; H05B 33/0845; H05B 33/0887
USPC .............................. 315/185 R, 186, 192, 193
See application file for complete search history.

(56) References Cited

U.S. PATENT DOCUMENTS

| | | |
|---|---|---|
| 4,866,368 A | 9/1989 | Bird |
| 8,598,809 B2 | 12/2013 | Negley et al. |
| 8,659,534 B2 * | 2/2014 | Kim ..................... G09G 3/3406 345/102 |
| 8,791,642 B2 | 7/2014 | van de Ven et al. |
| 8,970,131 B2 * | 3/2015 | Brandes ............. H05B 33/0803 315/185 R |
| 2009/0189846 A1 * | 7/2009 | Nishikawa ........... G09G 3/3406 345/102 |
| 2009/0315480 A1 * | 12/2009 | Yan .................... H05B 33/0815 315/297 |
| 2010/0079059 A1 * | 4/2010 | Roberts ..................... F21K 9/00 313/503 |

(Continued)

OTHER PUBLICATIONS

Betten J. "Overcome the challenges of driving parallel LED strings", EDN Network, UBM Canon Electronics Engineering Communities, Nov. 19, 2013, 7 Pages.

(Continued)

*Primary Examiner* — Tung X Le
(74) *Attorney, Agent, or Firm* — Myers Bigel, P.A.

(57) ABSTRACT

Lighting apparatus includes a first string of light-emitting diodes (LEDs) having a first terminal coupled to a current source and configured to produce a first correlated color temperature (CCT) and a second string of LEDs having a first terminal coupled to the current source and configured to produce a second CCT different from the first CCT. The lighting apparatus further includes a current control circuit coupled to second terminals of the first and second strings of LEDs and configured to vary a proportionality relationship between current levels in the first and second strings of LEDs responsive to variation in a current provided by the current source to the first terminals of the first and second strings of LEDs. The current control circuit may include a current mirror circuit and a control circuit configured to selectively enable and disable the current mirror circuit.

21 Claims, 8 Drawing Sheets

(56) References Cited

U.S. PATENT DOCUMENTS

| | | | |
|---|---|---|---|
| 2011/0254456 A1* | 10/2011 | Ko | H05B 33/0827 |
| | | | 315/185 R |
| 2012/0306370 A1 | 12/2012 | Van De Ven et al. | |
| 2012/0306387 A1 | 12/2012 | Ferguson | |
| 2013/0154490 A1* | 6/2013 | Harbers | H05B 33/0842 |
| | | | 315/193 |
| 2013/0200801 A1* | 8/2013 | Fratti | H05B 33/0827 |
| | | | 315/122 |
| 2013/0249422 A1* | 9/2013 | Kerstens | H05B 33/0815 |
| | | | 315/193 |
| 2014/0210364 A1 | 7/2014 | Cash et al. | |
| 2014/0210368 A1 | 7/2014 | Lee et al. | |
| 2014/0232289 A1 | 8/2014 | Brandes et al. | |
| 2014/0333216 A1 | 11/2014 | Zhang et al. | |

OTHER PUBLICATIONS

Almeida P. et al. "A Novel Method of Current Equalization in LED Strings Based on Simple Linear Circuit", 2011 IEEE International Symposium on Industrial Electronics (ISIE), Jun. 2011, 6 Pages.
Wikipedia, the free encyclopedia, Color Temperature, Retrieved on Apr. 16, 2015 at URL https://en.wikipedia.org/wiki/Color_temperature.
Nimz T. et al. "Sensors and Feedback Control of Multi-Color LED Systems" LED Professional Review, Nov./Dec. 2012, pp. 2-5.
International Search Report and Written Opinion; corresponding to PCT/US16/43454; dated Oct. 6, 2016; (12 pages).

* cited by examiner

LIGHTING APPARATUS USING MULTIPLE LED STRINGS WITH CURRENT MIRROR CIRCUITRY AND METHODS OF OPERATING SAME

BACKGROUND

The present inventive subject matter relates to lighting apparatus and methods and, more particularly, to solid-state lighting apparatus and methods.

Solid-state lighting arrays are used for a number of lighting applications. A solid-state light-emitting device may include, for example, a packaged light emitting device including one or more light emitting diodes (LEDs). These may include inorganic LEDs, which may include semiconductor layers forming p-n junctions, and/or organic LEDs (OLEDs), which may include organic light emission layers.

Solid-state lighting devices are commonly used in lighting fixtures, including task lighting, recessed light fixtures, ceiling mounted troffers and the like. Solid-state lighting panels are also commonly used as backlights for small liquid crystal display (LCD) screens, such as LCD display screens used in portable electronic devices, and for larger displays, such as LCD television displays.

Solid-state lighting devices may be attractive for retrofit/replacement applications, where devices such as LEDs may offer improved energy efficiency, reduced heat generation, extended life and desired performance characteristics, such as certain color and/or color rendering capabilities. For example, LED bulbs are commonly used to replace incandescent bulbs in down lights and other applications to reduce energy consumption and increase time between replacements. LED-based replacements for fluorescent lamps have also been developed.

Figure 1:
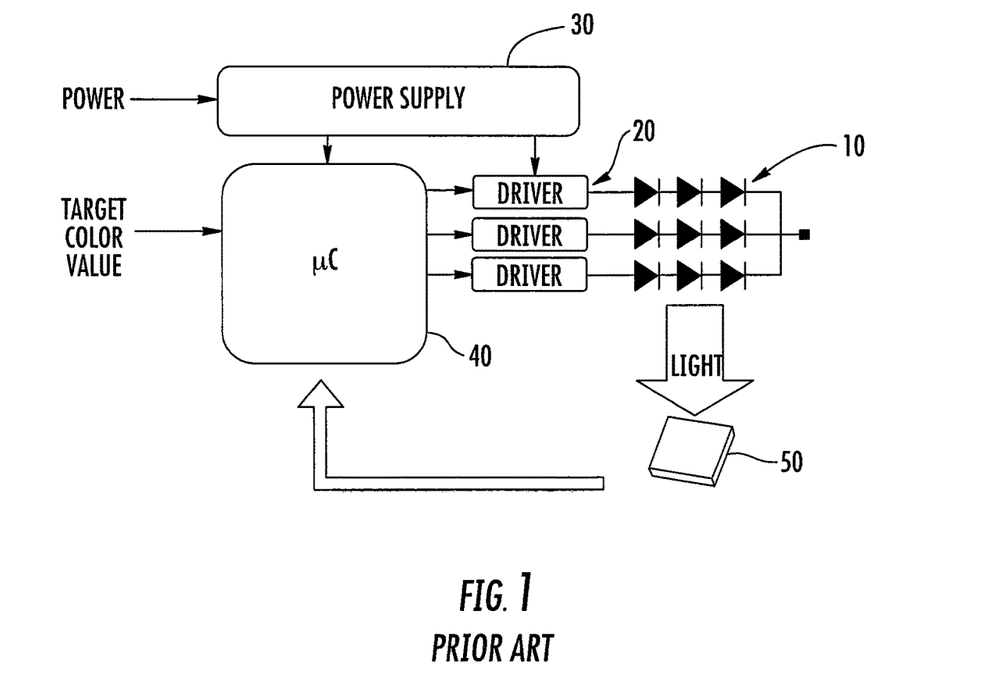
FIG. 1 is a schematic diagram illustrating a conventional LED lighting apparatus.

FIG. 1 illustrates a typical LED lighting apparatus. The apparatus includes multiple strings of series connected LEDs 10 driven by driver circuits 20. The multiple strings of LEDs 10 may provide different colors, e.g., blue, blue-shifted yellow (BSY), green and/or red. The driver circuits 20 provide current to the LEDs 10 from a current source, such as a power supply 30. The driver circuits 20 may be controlled by, for example, a processor 40 (e.g., a microprocessor or microcontroller). In particular, the driver circuits 20 may be pulse width modulated (PWM) current controllers that are driven by PWM control signals provided by the processor 40. A sensor 50 may detect light produced by the LEDs 10 and provide a measure of the actual color produced by the LEDs 10 to the controlling processor 40. The processor 40 may responsively control the driver circuits 20 to adjust currents passing through the individual strings of LEDs 10 to provide a light output with desired characteristics.

SUMMARY

Some embodiments of the inventive subject matter provide lighting apparatus including a first string of light-emitting diodes (LEDs) having a first terminal coupled to a current source and configured to produce a first correlated color temperature (CCT) and a second string of LEDs having a first terminal coupled to the current source and configured to produce a second CCT different from the first CCT. The lighting apparatus further includes a current control circuit coupled to second terminals of the first and second strings of LEDs and configured to vary a proportionality relationship between current levels in the first and second strings of LEDs responsive to variation in a current provided by the current source to the first terminals of the first and second strings of LEDs.

In some embodiments, the current control circuit may include a current mirror circuit having first and second current paths coupled to second terminals of respective ones of the first and second strings of LEDs and a bypass circuit coupled to the second string of LEDs and configured to bypass the second current path of the current mirror circuit. The bypass circuit may include a resistor coupled in parallel with the second current path of the current mirror circuit. In further embodiments, the bypass circuit may include a switch coupled in parallel with the second current path of the current mirror circuit.

In some embodiments, the first string of LEDs may include a first string of blue-shifted yellow (BSY) LEDs and the second string of LEDs may include a second string of BSY LEDs. The second CCT may be less than the first CCT. For example, in some embodiments, the first CCT may be about 3200 K, and the second CCT maybe about 2200 K. additional embodiments, the first CCT maybe about 4500 K and the second CCT maybe about 1800 K.

In some embodiments, the current mirror circuit comprises a first current mirror circuit and the bypass circuit comprises a first bypass circuit, and the lighting apparatus may further include a third string of LEDs, a second current mirror circuit having a first current path coupled to an output terminal of the first current mirror circuit and a second current path coupled to a third string of LEDs, and a second bypass circuit coupled to the output terminal of the first current mirror circuit and configured to bypass the first current path of the second current mirror circuit. The first, second, and third strings of LEDs may be configured to produce respective different CCTs.

In still further embodiments, the current mirror circuit may include a first current mirror circuit and the bypass circuit include a first bypass circuit, and the lighting apparatus may further include a third string of LEDs, a second current mirror circuit having a first current path coupled to an output terminal of the first current mirror circuit and a second current path coupled to a third string of LEDs, and a second bypass circuit coupled to the third string of LEDs and configured to bypass the second current path of the second current mirror circuit. The first, second, and third strings of LEDs may be configured to produce respective different CCTs.

In still further embodiments, the current control circuit may include a current mirror circuit having first and second current paths coupled to second terminals of respective ones of the first and second strings of LEDs and a control circuit configured to enable and inhibit current flow through the first current path of the current mirror circuit.

Additional embodiments provide methods including providing a current to first terminals of a first string of LEDs configured to produce a first CCT and a second string of LEDs configured to produce a second CCT different from the first CCT and varying a proportionality relationship between current levels in the first and second strings of LEDs responsive to variation in the provided current. The First and second strings of LEDs may include respective first and second strings of BSY LEDs. The second CCT may be less than the first CCT. Varying a proportionality relationship between current levels in the first and second strings of LEDs responsive to variation in the provided current may include passing current from respective ones of the first and second strings of BSY LEDs to respective first and second current paths of a current mirror and diverting current from the second string of BSY LEDs to bypass the second current path of the current mirror circuit.

BRIEF DESCRIPTION OF THE DRAWINGS

The accompanying drawings, which are included to provide a further understanding of the inventive subject matter and are incorporated in and constitute a part of this application, illustrate certain embodiment(s) of the inventive subject matter.

DETAILED DESCRIPTION

Embodiments of the present inventive subject matter now will be described more fully hereinafter with reference to the accompanying drawings, in which embodiments of the inventive subject matter are shown. This inventive subject matter may, however, be embodied in many different forms and should not be construed as limited to the embodiments set forth herein. Rather, these embodiments are provided so that this disclosure will be thorough and complete, and will fully convey the scope of the inventive subject matter to those skilled in the art. Like numbers refer to like elements throughout.

Some embodiments of the inventive subject matter may provide relatively simple and effective control of lighting output characteristics by using multiple LED strings, such as BSY LEDs strings producing different CCTs, controlled by a current mirror circuit. In some embodiments, the current mirror circuit may be activated and deactivated using, for example, a bypass resistor or a switch. Such apparatus may be used to implement a "dim-to-warm" performance without requiring overly complex control circuitry.

Figure 2:
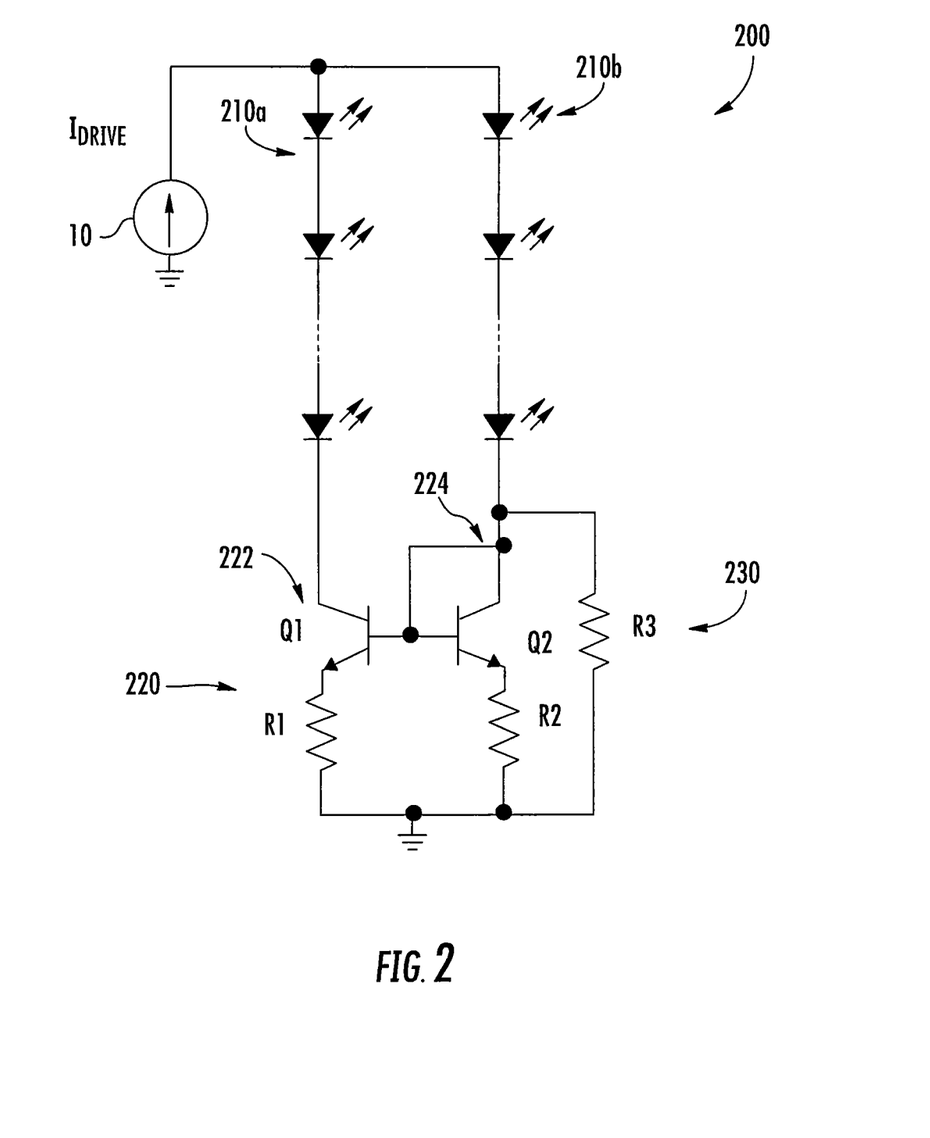
FIG. 2 is a schematic diagram illustrating a lighting apparatus according to some embodiments.

FIG. 2 illustrates a lighting apparatus 200 according to some embodiments of the inventive subject matter. The apparatus 200 includes first and second strings 210a, 210b of LEDs. In some embodiments, the first and second strings 210a, 210b may be respective BSY LED strings configured to produce respective different CCTs. The BSY LEDs may be, for example, phosphor-converted LEDs (e.g., phosphor-coated blue LEDs). The first string 210a may be a string of BSY LEDs having a relatively "cool" CCT, while the second string 210b may be a string of BSY LEDs having a relatively "warm" CCT. The first and second LED strings 210a, 210b are coupled to a current control circuit, here shown as including a current mirror circuit 220 and a bypass circuit 230 configured to bypass one leg of the current mirror circuit 220. The current mirror circuit includes first and second transistors Q1, Q2 and resistors R1, R2 which control a gain of the current mirror circuit 220 (i.e., control a proportionality between the currents passing through the first and second LED strings 210a, 210b), thus controlling the relative contributions of "cool" and "warm" light from the first and second LED strings 210a, 210b. It will be appreciated that the current gain may be unity in some embodiments, while other embodiments may use a non-unity gain.

The bypass circuit 230, here shown as including a resistor R3, is configured to activate and deactivate the current mirror circuit 220 responsive to a current $I_{DRIVE}$ provided by a current source 10, which may be a circuit included in the apparatus 200 or an external current source. In particular, the resistor R3 defines a cutoff point for operation of the current mirror circuit 220, as explained below.

Figure 3:
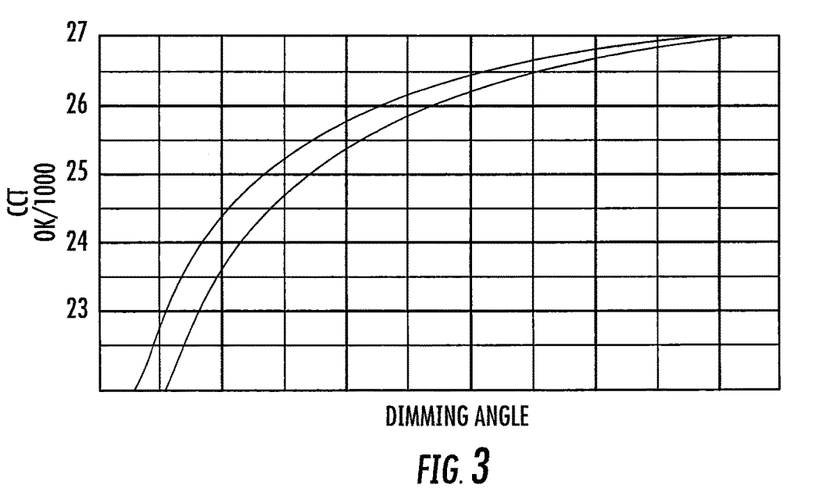
FIGS. 3-5 illustrate simulated performance of the lighting apparatus of FIG. 2.
Figure 4:
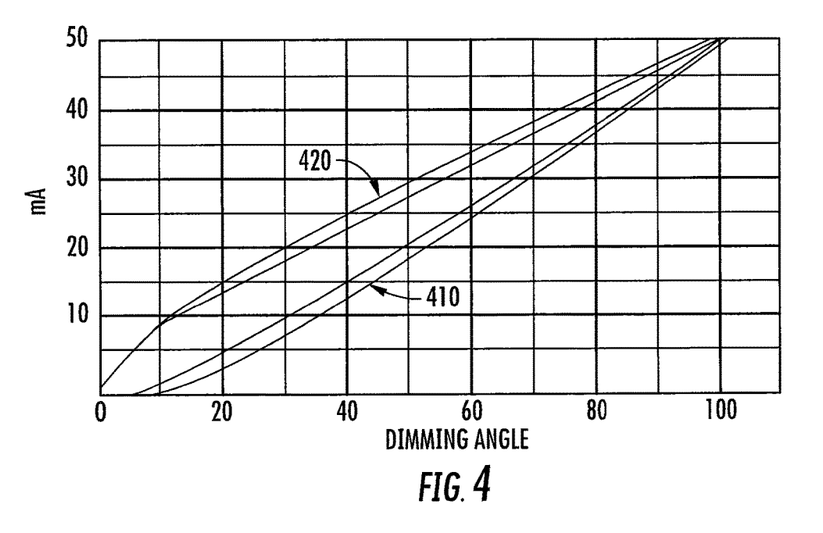
Figure 5:
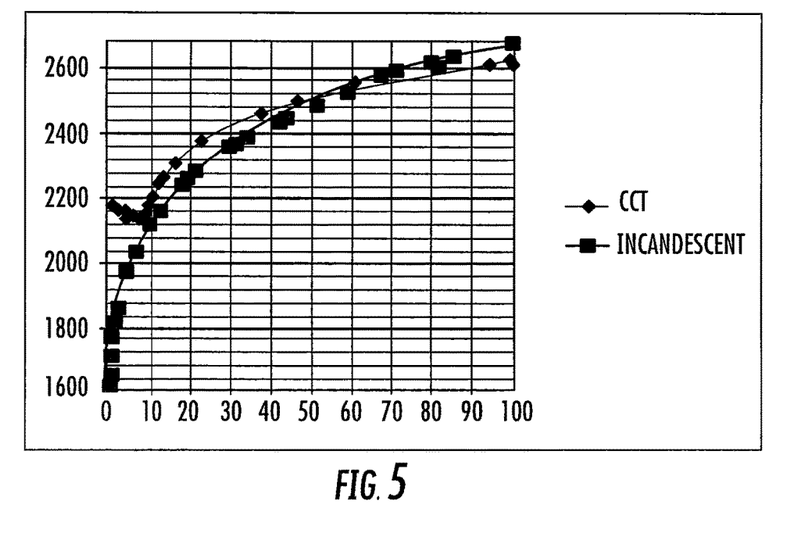

FIGS. 3-5 illustrate simulated performance of the apparatus 200 illustrated in FIG. 2. In particular, FIG. 3 illustrates the CCT of the combined light output of an apparatus using a 3200 K "cool" string (the first string 210a of FIG. 2) and a 2200 K "warm" string (the second string 210b in FIG. 2) for device operating temperatures of 25° C. and 110° C., and FIG. 4 illustrates currents 410, 420 in the respective "cool" and "warm" strings 210a, 210b at the given temperatures. In FIGS. 3 and 4, the horizontal axis represents a dimming angle associated with the level of the drive current provided to the LED strings (e.g., from the current source 10 of FIG. 2), with the light output of the apparatus increasing with dimming angle. For this example, a full illumination (undimmed) CCT of about 2700 K is achieved. Referring to FIG. 2, this example uses resistor circuit values of R1=0.1Ω, R2=0.47Ω, R3=47Ω, and the transistors Q1 and Q2 are MMDT4401 bipolar junction transistors (BJTs).

As can be seen in FIG. 4, below a certain threshold source current level, the "cool" string 210a is substantially turned off, and the CCT of the light output of the apparatus corresponds to the CCT of the output of the "warm" string 210b. Above this threshold current, the "cool" string 210a begins to conduct via the leg of the current mirror circuit 220 to which it is connected, thus causing an increase in the CCT of the output of the apparatus. As shown in FIG. 5, simulation indicates that the CCT behavior of such an apparatus, i.e., an apparatus consisting of only BSY strings with different CCTs, may approximate the behavior of an incandescent lamp within certain bounds, namely, the lower bound defined by the "warm" string and an upper bound defined by the relationship between the CCTs of the strings and the characteristics of the current mirror circuit to which they are coupled. Accordingly, some embodiments of the inventive subject matter may provide a relatively simple control arrangement with a desirable "dim to warm" behavior. A potential advantage of using BSY strings in this manner in comparison to, for example, devices that use RGB (red, blue, green) or other color mixing techniques, is that the outputs of the BSY strings in response to variation in temperature may more closely track one another, while systems that use other combinations of LEDs may exhibit greater variance in temperature performance.

It will be appreciated that FIGS. 3 and 4 illustrate an example, and that other arrangements of LED strings with other CCT characteristics and/or other component values may be used in some embodiments. For example, a full illumination target CCT of 2700 K may be achieved using a 4500 K "cool" BSY string and an 1800 K "warm" BSY string. Such an arrangement may provide a different "dim-to-warm" behavior than that described above with reference to FIGS. 3 and 4.

Figure 6:
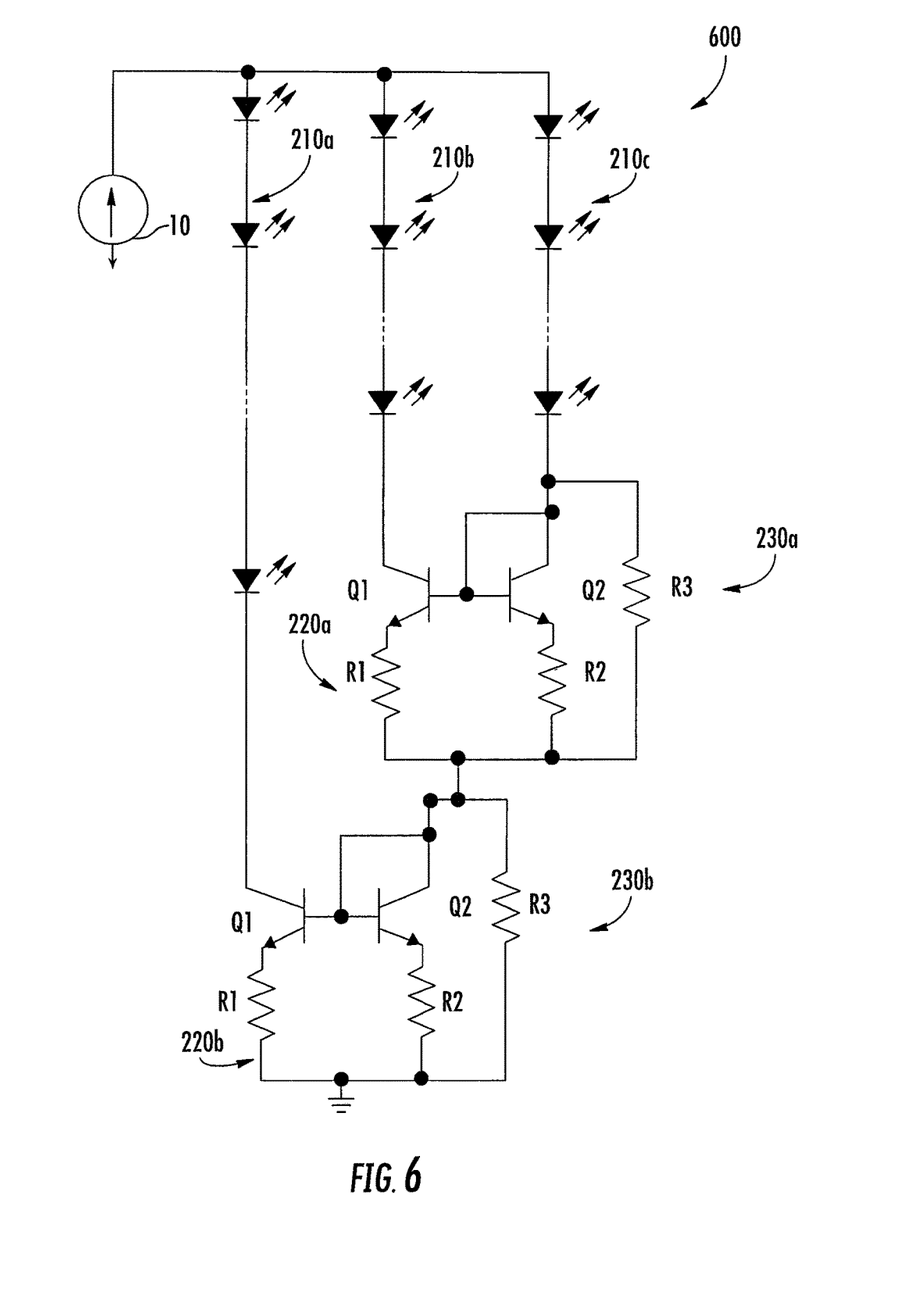
FIGS. 6 and 7 are schematic diagrams illustrating lighting apparatus with multiple current mirror circuits according to further embodiments.

According to further embodiments, control circuitry along the lines discussed above with reference to FIGS. 2-5 may be used to generate a desirable light output from more than two LED strings. Referring to FIG. 6, a lighting apparatus 600 according to further embodiments may include first, second, and third LED strings 210a, 210b, 210c. The second and third LED strings 210b, 210c may be coupled to a first current control circuit including a first current mirror circuit 220a and a first bypass circuit 230a. The output of the first current control circuit is provided to a second current control circuit including a second current mirror circuit 220b and a second bypass circuit 230b, with the first LED string 210a being coupled to the second current mirror circuit 220b. Similar to the apparatus 200 illustrated in FIG. 2, the first, second, and third LED strings 210a, 210b, 210c may be BSY LEDs strings having different CCTs. The first LED string 210a may be "cooler" than the second LED string 210b, which, in turn, may be "cooler" that the third LED string 210c. Such an arrangement may, for example, provide additional controllability to facilitate achieving a desirable CCT behavior in response to dimming, for example, in response to variation of a current produced by a current source 10 coupled to the LED strings 210a, 210b, 210c.

Figure 7:
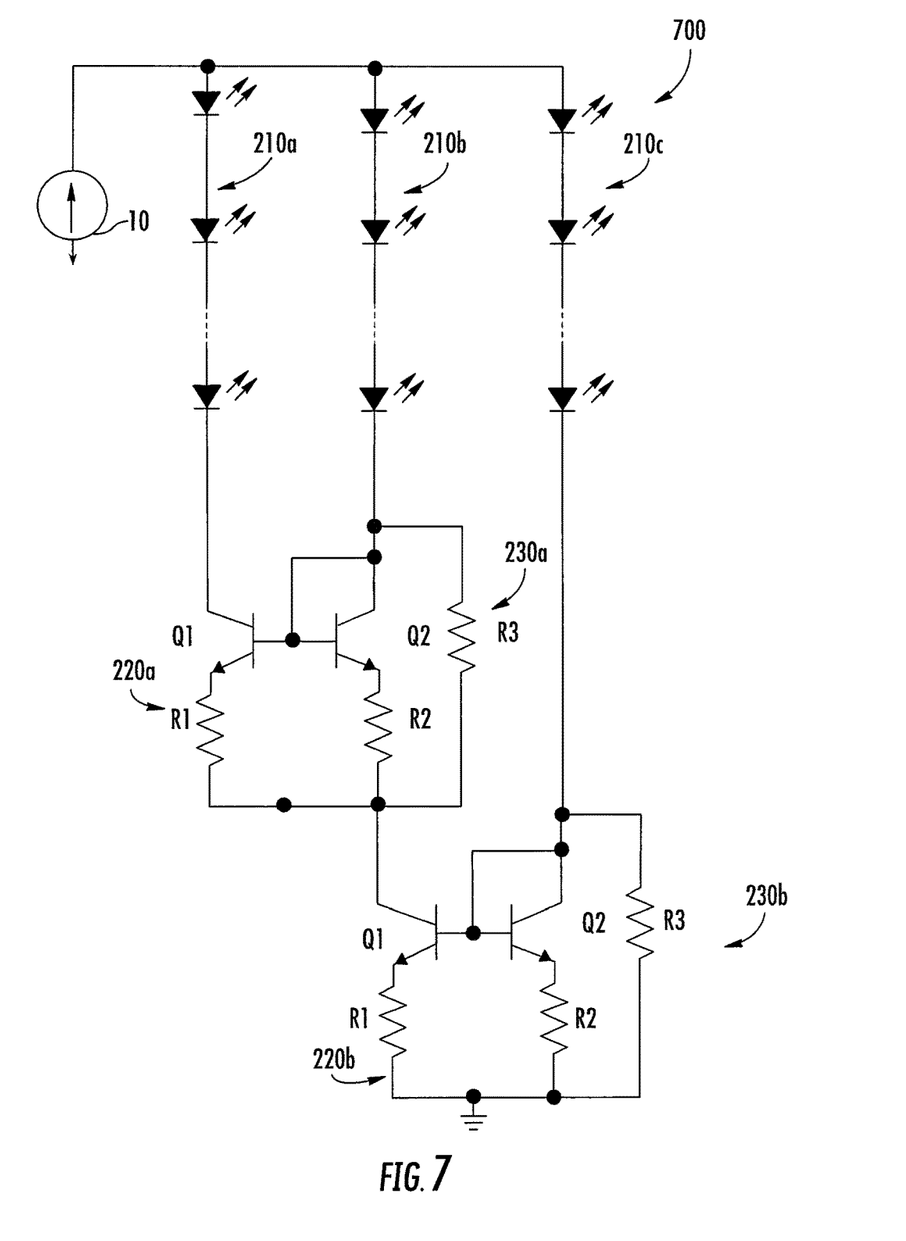

FIG. 7 illustrates a lighting apparatus 700 with an alternative arrangement of LED strings and current mirror circuitry. The apparatus 700 includes first, second, and third LED strings 210a, 210b, 210c. The first and second LED strings 210a, 210b may be coupled to a first current control circuit including a first current mirror circuit 220a and a first bypass circuit 230a. The output of the first current control circuit may be provided to a second current control circuit including a second current mirror circuit 220b and a second bypass circuit 230b, which is also coupled to the third LED string 210c. As with the embodiments illustrated in FIG. 6, the first, second, and third LED strings 210a, 210b, 210c may be BSY strings producing different CCT's. More particularly, the first LED string 210a may be "cooler" than the second LED string 210b, which may, in turn, be "cooler" that the third LED string 210c. As current provided by a current source 10 varies, the CCT produced by the lighting apparatus may vary to provide a desired performance, such as a "dim-to-warm" performance.

Figure 8:
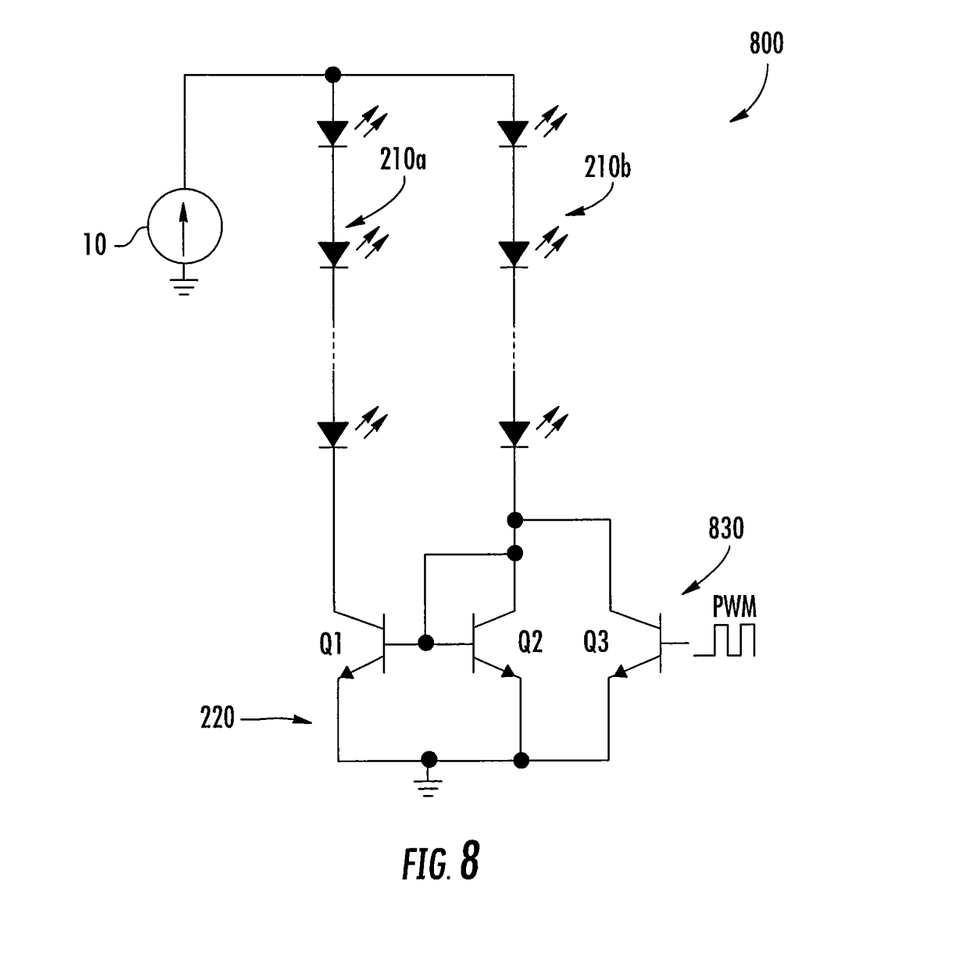
FIG. 8 is a schematic diagram illustrating a lighting apparatus with a switched current mirror bypass according to some embodiments.
Figure 9:
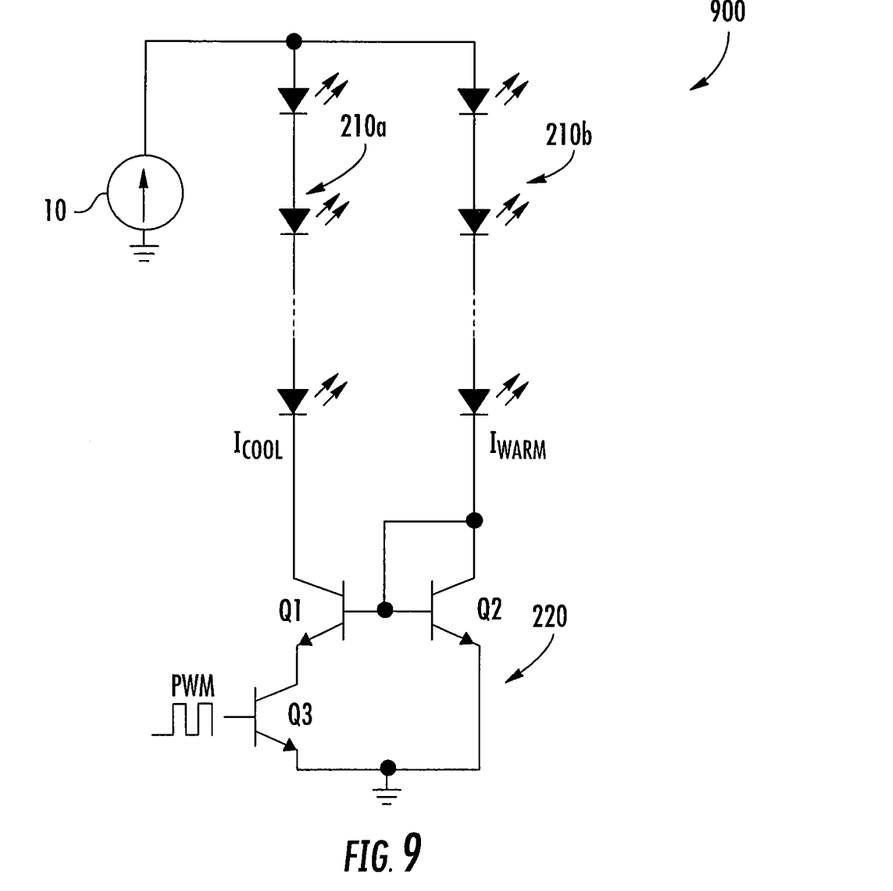
FIG. 9 is a schematic diagram illustrating a lighting apparatus with a switched current mirror circuit according to further embodiments.

According to further embodiments, lighting apparatus may include current mirror control circuitry selectively activated and deactivated using other techniques. For example, FIG. 8 illustrates a lighting apparatus 800 including first and second LED strings 210a, 210b coupled to a current mirror circuit 220. In the illustrated embodiment, however, a bypass circuit 830 in the form of a transistor Q3 is used to bypass the leg of the current mirror circuit 220 coupled to the second LED string 210b. When the transistor Q3 is "on", the current mirror circuit 220 is effectively deactivated, causing current from the current source 10 to flow only through the second LED string 210b, Conversely, when the transistor Q3 is "off", the current mirror circuit 220 is activated, causing the current through the first LED string 210a to track the current through the second LED string 210b. The transistor Q3 may be pulse width modulated to control the average current in each of the strings and the CCT produced by the apparatus 800. FIG. 9 illustrates an apparatus 900 with an alternative arrangement wherein a transistor Q3 is placed within one leg, of a current mirror circuit 220. The transistor Q3 may be turned "off" to disable operation of the current mirror circuit 220 such that current flows exclusively through the second LED string 210b, When the transistor Q3 is turned "on", the current mirror circuit 220 is enabled. The transistor Q3 may be pulse width modulated to control the CCT of the light output produced by the apparatus 900.

It will be appreciated that the apparatus illustrated in FIGS. 2 and 6-9 represent examples of the inventive subject matter, and that further embodiments may be implemented in a number of different ways. For example, although the embodiments illustrated in FIGS. 2 and 6-9 are shown as including bipolar transistors, it will be appreciated that functionally similar circuitry may be implemented using other types of devices, such as FETs and/or diodes.

The terminology used herein is for the purpose of describing particular embodiments only and is not intended to be limiting to other embodiments. As used herein, the singular forms "a", "an" and "the" are intended to include the plural forms as well, unless the context clearly indicates otherwise. It will be further understood that the terms "comprises," "comprising," "includes" and/or "including", "have" and/or "having" when used herein, specify the presence of stated features, integers, steps, operations, elements, and/or components, but do not preclude the presence or addition of one or more other features, integers, steps, operations, elements, components, and/or groups thereof. Elements described as being "to" perform functions, acts and/or operations may be configured to or otherwise structured to do so. As used herein, the term "and/or" or "/" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. When a third element "couples" first and second elements, additional intervening elements may be present between the third element and the respective first and second elements. It will be further understood that elements "coupled in series" or "serially connected" may be directly coupled or may be coupled via intervening elements.

Unless otherwise defined, all terms (including technical and scientific terms) used herein have the same meaning as commonly understood by one of ordinary skill in the art to which this present inventive subject matter belongs. It will be further understood that terms used herein should be interpreted as having a meaning that is consistent with their meaning in the context of this specification and the relevant art and will not be interpreted in an idealized or overly formal sense unless expressly so defined herein. The term "plurality" is used herein to refer to two or more of the referenced item.

The corresponding structures, materials, acts, and equivalents of any means or step plus function elements in the claims below are intended to include any disclosed structure, material, or act for performing the function in combination with other claimed elements as specifically claimed. The description of various embodiments of the inventive subject matter herein has been presented for purposes of illustration and description, but is not intended to be exhaustive or limited to the forms disclosed. Many modifications and variations will be apparent to those of ordinary skill in the art without departing from the scope and spirit of the disclosure.

In the drawings and specification, there have been disclosed typical embodiments and, although specific terms are employed, they are used in a generic and descriptive sense only and not for purposes of limitation, the scope of the disclosure being set forth in the following claims.

What is claimed is:

1. A lighting apparatus comprising:
   a first string of light-emitting diodes (LEDs) having a first terminal coupled to a current source and configured to produce light having a first correlated color temperature (CCT);
   a second string of LEDs having a first terminal coupled to the current source and configured to produce light having a second CCT different from the first CCT; and
   a current control circuit comprising a current mirror circuit having respective first and second current paths coupled to respective ones of second, terminals of the first and second strings of LEDs and a bypass circuit configured to control operation of the current mirror circuit to vary a CCT of light produced by the lighting apparatus by varying a proportionality relationship between a first current level in the first string of LEDs and a second current level in the second string of LEDs.

2. The lighting apparatus of claim 1,
   wherein the first string of LEDs comprises a first string of blue-shifted yellow (BSY) LEDs; and
   wherein the second string of LEDs comprises a second string of BSY LEDs.

3. The lighting apparatus of claim 2, wherein the second CCT is less than the first CCT.

4. The lighting, apparatus of claim 3, wherein the first CCT is about 3200 K, and wherein the second CCT is about 2200 K.

5. The lighting apparatus of claim 3, wherein the first CCT is about 4500 K and wherein the second CCT is about 1800 K.

6. The lighting apparatus of claim 2, wherein the bypass circuit is coupled to the second string of BSY LEDs and configured to divert current passing from the second string of BSY LEDs to bypass the second current path of the current mirror circuit.

7. The lighting apparatus of claim 6, wherein the bypass circuit comprises a resistor coupled in parallel with the second current path of the current mirror circuit.

8. The fighting apparatus of claim 1, wherein the first and second strings of LEDs comprise first and second strings of phosphor-converted LEDs.

9. The lighting apparatus of claim 1, wherein the bypass circuit is coupled to the second string of LEDs and configured to bypass the second current path of the current mirror circuit.

10. The lighting apparatus of claim 9, wherein the current mirror circuit comprises a first current mirror circuit and wherein the bypass circuit comprises a first bypass circuit, and further comprising:
    a third string of LEDs;
    a second current mirror circuit having a first current path coupled to an output terminal of the first current mirror circuit and a second current path coupled to a third string of LEDs; and
    a second bypass circuit coupled to the output terminal of the first current mirror circuit and configured to bypass the first current path of the second current mirror circuit.

11. The lighting apparatus of claim 10, wherein the first, second, and third strings of LEDs are configured to produce light having respective different CCTs.

12. The lighting apparatus of claim 9, wherein the current mirror circuit comprises a first current mirror circuit and wherein the bypass circuit comprises a first bypass circuit, and further comprising:
    a third string of LEDs;
    a second current mirror circuit having a first current path coupled to an output terminal of the first current mirror circuit and a second current path coupled to a third string of LEDs; and
    a second bypass circuit coupled to the third string of LEDs and configured to, bypass the second current path of the second current mirror circuit.

13. The lighting apparatus of claim 12, wherein the first, second, and third strings of LEDs are configured to produce light having respective different CCTs.

14. The lighting apparatus of claim 1, wherein the bypass circuit is configured to enable and inhibit current flow through the first current path of the current mirror circuit.

15. A method comprising:
    providing a current to first terminals of a first string of LEDs configured to produce light having a first CCT and a second string of LEDs configured, to produce light having a second CCT different from the first CCT; and
    using a bypass circuit to control a current mirror circuit having first and second paths connected to respective ones of second terminals of the first and second strings of LEDs to vary a proportionality relationship between current levels in the first and second strings of LEDs,
    wherein using the bypass circuit to control the current mirror circuit comprises diverting current from the second string of LEDs to bypass the second current path of the current mirror circuit.

16. The method of claim 15, wherein the first and second strings of LEDs comprise respective first and second strings of BSY LEDs.

17. The method of claim 16, wherein the second CCT is less than the first CCT.

18. The method of claim 16, wherein varying a proportionality relationship between current levels in the first and second strings of LEDs is performed responsive to variation in the provided current, and comprises:
    passing current from respective ones of the first and second strings of BSY LEDs to respective first and second current paths of a current mirror.

19. The method of claim 15, wherein using the bypass circuit to control the current mirror circuit comprises enabling and inhibiting current flow through the first current path of the current mirror circuit.

20. The method of claim 15, wherein using the bypass circuit to control the current mirror circuit comprises controlling the current mirror circuit responsive to variation in the current provided to the first terminals of the first and second strings of LEDs.

21. A lighting apparatus comprising:
    a first string of light-emitting diodes (LEDs) having a first terminal coupled to a current source and configured to produce light having a first correlated color temperature (CCT);
    a second string of LEDs having a first terminal coupled to the current source and configured to produce light having a second CCT different from the first CCT; and
    a current control circuit comprising a current mirror circuit having respective first and second current paths coupled to respective ones of second terminals of the first and second strings of LEDs and a bypass circuit configured to control operation of the current mirror circuit to vary a CCT of light produced by the lighting apparatus by varying a proportionality relationship between current levels in the first and second strings of LEDs,
    wherein the bypass circuit is configured to vary the proportionality relationship between the current levels in the first and second strings of LEDs responsive to variation in a current provided by the current source to the first terminals of the first and second strings of LEDs.

* * * * *

UNITED STATES PATENT AND TRADEMARK OFFICE
CERTIFICATE OF CORRECTION

PATENT NO. : 10,009,971 B2
APPLICATION NO. : 14/807431
DATED : June 26, 2018
INVENTOR(S) : Chobot et al.

Page 1 of 1

It is certified that error appears in the above-identified patent and that said Letters Patent is hereby corrected as shown below:

In the Claims

Column 7, Claim 1, Line 12:
Please correct "second, terminals" to read -- second terminals --

Column 7, Claim 4, Line 26:
Please correct "lighting, apparatus" to read -- lighting apparatus --

Column 8, Claim 12, Line 7:
Please correct "to, bypass" to read -- to bypass --

Column 8, Claim 15, Line 18:
Please correct "configured, to" to read -- configured to --

Signed and Sealed this
Sixteenth Day of October, 2018

Andrei Iancu
*Director of the United States Patent and Trademark Office*